United States Patent
Raman et al.

(10) Patent No.: US 9,711,297 B2
(45) Date of Patent: Jul. 18, 2017

(54) METHODS FOR SOLID ELECTROLYTE INTERPHASE FORMATION AND ANODE PRE-LITHIATION OF LITHIUM ION CAPACITORS

(71) Applicant: Maxwell Technologies, Inc., San Diego, CA (US)

(72) Inventors: Santhanam Raman, San Diego, CA (US); Xiaomei Xi, Carlsbad, CA (US); Xiang-Rong Ye, San Diego, CA (US)

(73) Assignee: Maxwell Technologies, Inc., San Diego, CA (US)

( * ) Notice: Subject to any disclaimer, the term of this patent is extended or adjusted under 35 U.S.C. 154(b) by 388 days.

(21) Appl. No.: 14/258,784

(22) Filed: Apr. 22, 2014

(65) Prior Publication Data
US 2014/0313639 A1 Oct. 23, 2014

Related U.S. Application Data

(60) Provisional application No. 61/815,157, filed on Apr. 23, 2013.

(51) Int. Cl.
| | |
|---|---|
| H01G 9/00 | (2006.01) |
| H01G 11/50 | (2013.01) |
| H01G 11/06 | (2013.01) |
| H01G 11/86 | (2013.01) |
| H01M 4/133 | (2010.01) |
| H01M 4/1393 | (2010.01) |
| H01M 4/04 | (2006.01) |

(Continued)

(52) U.S. Cl.
CPC ............ *H01G 11/50* (2013.01); *H01G 11/06* (2013.01); *H01G 11/86* (2013.01); *H01M 4/0459* (2013.01); *H01M 4/133* (2013.01); *H01M 4/1393* (2013.01); *H01M 4/587* (2013.01); *H01M 6/5005* (2013.01); *Y02E 60/13* (2013.01)

(58) Field of Classification Search
CPC ...... H01G 9/00; H01G 9/0036; H01G 9/0032; H01G 9/04; H01G 9/15; H01G 9/145
See application file for complete search history.

(56) References Cited

U.S. PATENT DOCUMENTS

| | | | | |
|---|---|---|---|---|
| 4,442,187 A | * | 4/1984 | MacDiarmid | H01B 1/125 429/213 |
| 4,496,640 A | * | 1/1985 | Kobayashi | H01B 1/125 429/199 |

(Continued)

FOREIGN PATENT DOCUMENTS

| | | |
|---|---|---|
| CN | 103050295 | 4/2013 |
| EP | 2234194 | 9/2010 |
| EP | 2506345 | 10/2012 |

*Primary Examiner* — Seahvosh Nikmanesh
(74) *Attorney, Agent, or Firm* — Knobbe Martens Olson & Bear, LLP

(57) ABSTRACT

A method of pre-doping an anode of an energy storage device can include immersing the anode and a dopant source in an electrolyte, and coupling a substantially constant current between the anode and the dopant source. A method of pre-doping an anode of an energy storage device can include immersing the anode and a dopant source in an electrolyte, and coupling a substantially constant voltage across the anode and the dopant source. An energy storage device can include an anode having a lithium ion pre-doping level of about 60% to about 90%.

28 Claims, 8 Drawing Sheets

(51) Int. Cl.
    *H01M 4/587*    (2010.01)
    *H01M 6/50*     (2006.01)

(56) References Cited

U.S. PATENT DOCUMENTS

| | | | |
|---|---|---|---|
| 4,728,589 A * | 3/1988 | MacDiarmid | H01B 1/125 |
| | | | 429/199 |
| 4,801,512 A * | 1/1989 | MacDiarmid | H01B 1/125 |
| | | | 205/57 |
| 5,743,921 A | 4/1998 | Nazri et al. | |
| 5,759,715 A | 6/1998 | Barker et al. | |
| 9,076,591 B2 * | 7/2015 | Zheng | H01G 9/042 |
| 2011/0256438 A1 | 10/2011 | Taguchi et al. | |
| 2011/0310529 A1 | 12/2011 | Min et al. | |
| 2012/0042490 A1 | 2/2012 | Lee et al. | |
| 2012/0262845 A1* | 10/2012 | Lee | H01G 9/02 |
| | | | 361/505 |
| 2012/0300366 A1 | 11/2012 | Cho et al. | |
| 2013/0070391 A1* | 3/2013 | Zheng | H01G 9/042 |
| | | | 361/508 |
| 2014/0272523 A1* | 9/2014 | Otsuka | H01M 10/052 |
| | | | 429/126 |

* cited by examiner

| Pre-lithiation Voltage | % of predoping | Capacitance, F | ESR, Ohms | RC |
|---|---|---|---|---|
| 0.01 | 86 | 17.5 | 0.39 | 6.82 |
| 0.1 | 60 | 17.6 | 0.34 | 5.98 |
| 0.3 | 46 | 15.6 | 0.51 | 7.96 |
| 0.4 | 43 | 17.9 | 0.39 | 6.98 |

*FIG. 5*

| C-rate | % of predoping | Capacitance, F | ESR, Ohms | RC |
|---|---|---|---|---|
| C/24 | 30 | 11.6 | 1.29 | 14.96 |
| C/48 | 43 | 16.6 | 0.57 | 9.46 |
| C/72 | 51 | 16.8 | 0.46 | 7.73 |
| C/96 | 61 | 17.3 | 0.36 | 6.23 |
| C/120 | 62 | 17.7 | 0.36 | 6.37 |
| C/144 | 65 | 17.5 | 0.34 | 5.95 |

*FIG. 7*

METHODS FOR SOLID ELECTROLYTE INTERPHASE FORMATION AND ANODE PRE-LITHIATION OF LITHIUM ION CAPACITORS

CROSS REFERENCE TO RELATED APPLICATIONS

This application claims the benefit of U.S. Provisional Application Ser. No. 61/815,157, filed Apr. 23, 2013, entitled "METHODS FOR SOLID ELECTROLYTE INTERPHASE FORMATION AND ANODE PRE-LITHIATION OF LITHIUM ION CAPACITORS," which is hereby incorporated herein by reference in its entirety.

STATEMENT REGARDING FEDERALLY SPONSORED R&D

This invention was made with government support under DEFC2605NT42403 awarded by the United States Department of Energy. The government has certain rights in the invention.

BACKGROUND

Field

The present invention relates generally to electric energy storage devices, and more specifically, to a method of pre-doping an electrode of an energy storage device with ionic species.

Description of the Related Art

Lithium ion capacitors may be used to power a diverse range of electronic devices, including for example in wind power generation systems, uninterruptible power source systems (UPS), photo voltaic power generation, and/or energy recovery systems in industrial machinery and transportation systems. Lithium ion capacitors can have a variety of shapes (e.g., prismatic, cylindrical and/or button shaped). A lithium ion capacitor (LIC) can include an anode and a cathode immersed in an electrolyte which provides a transport of ionic species between the anode and the cathode. Lithium ion capacitors can be a type of hybrid ultracapacitor, exhibiting significant electrostatic and electrochemical energy storage. For example, electrical charge can be stored at an electrical double layer formed at an interface between an electrolyte and an electrode (e.g., between a lithium ion capacitor electrolyte and a lithium ion capacitor cathode). Electrical energy in a lithium ion capacitor may also be stored through adsorption of ionic species into an electrode (e.g., adsorption of lithium ions into a lithium ion capacitor anode). Lithium ions can be incorporated into the anode of the lithium ion capacitor through a pre-doping process.

A solid-electrolyte interphase (SEI) layer may form adjacent a surface of a lithium-ion capacitor anode. A solid-electrolyte interphase layer may form during an anode pre-doping process. For example, the solid-electrolyte interphase layer may form at least in part due to an electrochemical reaction at the anode surface involving an electrolyte solvent and/or an electrolyte salt. The solid-electrolyte interphase layer may electrically insulate the anode while allowing an ionic transport to the anode.

SUMMARY

Embodiments can include a method of pre-doping an anode of an energy storage device, the method including immersing the anode and a dopant source in an electrolyte, where the dopant source can include a source for lithium ions. The method can include coupling a substantially constant current between the anode and the dopant source.

In some embodiments, the energy storage device can include a lithium ion capacitor.

In some embodiments, the coupling can include coupling the substantially constant current between the anode and the dopant source for a duration of time to achieve a potential difference between the anode and the dopant source of about 0.01 Volts (V) to about 0.4 V. In some embodiments, the coupling can include coupling the substantially constant current between the anode and the dopant source for a duration of time to achieve an anode pre-doping level of about 60% to about 90%. In some embodiments, coupling the substantially constant current between the anode and the dopant source can include coupling a current source supplying a substantially constant current corresponding to a current C-rate of about C/72 to about C/144.

In some embodiments, the method can include forming a substantially homogeneous solid-electrolyte interphase layer adjacent the anode, where the solid-electrolyte interphase layer is substantially undisturbed subsequent to its formation.

In some embodiments, the method can include removing the dopant source from the electrolyte subsequent to coupling the substantially constant current across the anode and the dopant source. In some embodiments, the method can include immersing a cathode in the electrolyte, wherein immersing the dopant source can include immersing the dopant source to a side of the anode opposite that facing the cathode.

In some embodiments, the method can include performing a formation step subsequent to coupling the substantially constant current across the anode and the dopant source. The formation step can include applying a substantially constant voltage of about 2 Volts (V) to about 4.2 V between the anode and the dopant source. In some embodiments, performing the formation step can include applying the substantially constant voltage of about 2 Volts (V) to about 4.2 V between the anode and the dopant source for a duration of about 5 hours to about 75 hours.

Embodiments can include a method of pre-doping an anode of an energy storage device, the method including immersing the anode and a dopant source in an electrolyte, where the dopant source can include a source for lithium ions. The method can include coupling a substantially constant voltage across the anode and the dopant source.

In some embodiments, the energy storage device can include a lithium ion capacitor.

In some embodiments, coupling the substantially constant voltage across the anode and the dopant source can include coupling a voltage source supplying a substantially constant voltage of about 0.01 Volts (V) to about 0.4V. In some embodiments, coupling the substantially constant voltage across the anode and the dopant source can include coupling the substantially constant voltage for a duration of time to achieve an anode lithium ion pre-doping level of about 60% to about 90%.

In some embodiments, the method can include performing a formation step subsequent to coupling the substantially constant voltage across the anode and the dopant source. The formation step can include applying a substantially constant voltage of about 2 Volts (V) to about 4.2 V between the anode and the dopant source. In some embodiments, performing the formation step can include applying the substantially constant voltage of about 2 Volts (V) to about 4.2

V between the anode and the dopant source for a duration of about 5 hours to about 75 hours.

In some embodiments, the method can include forming a substantially homogeneous solid-electrolyte interphase layer adjacent the anode, where the solid-electrolyte interphase layer can be substantially undisturbed subsequent to its formation.

In some embodiments, the method can include removing the dopant source subsequent to coupling the substantially constant voltage across the anode and the dopant source. In some embodiments, the method can include immersing a cathode in the electrolyte, where immersing the dopant source can include immersing the dopant source to a side of the anode opposite that facing the cathode.

Embodiments can include an energy storage device having a cathode, an anode having a lithium ion pre-doping level of about 60% to about 90%; and a separator between the anode and the cathode configured to provide electrical insulation between the anode and the cathode.

In some embodiments, the device can include a dopant source to a side of the anode opposite that facing the cathode. In some embodiments, the dopant source can include lithium metal. In some embodiments, the device can include a second separator between the anode and the dopant source.

In some embodiments, the device can include a non-aqueous electrolyte conductive of lithium ions. In some embodiments, the anode can include graphite.

In some embodiments, the energy storage device can include a lithium ion capacitor.

For purposes of summarizing the invention and the advantages achieved over the prior art, certain objects and advantages are described herein. Of course, it is to be understood that not necessarily all such objects or advantages need to be achieved in accordance with any particular embodiment. Thus, for example, those skilled in the art will recognize that the invention may be embodied or carried out in a manner that can achieve or optimize one advantage or a group of advantages without necessarily achieving other objects or advantages.

All of these embodiments are intended to be within the scope of the invention herein disclosed. These and other embodiments will become readily apparent to those skilled in the art from the following detailed description having reference to the attached figures, the invention not being limited to any particular disclosed embodiment(s).

BRIEF DESCRIPTION OF THE DRAWINGS

These and other features, aspects, and advantages of the present disclosure are described with reference to the drawings of certain embodiments, which are intended to illustrate certain embodiments and not to limit the invention.

FIG. 5 is a table listing measured performance parameters of lithium ion capacitors having an anode which was pre-doped using a constant voltage pre-doping step.

FIG. 7 is a table listing measured performance parameters of lithium ion capacitors having an anode which was pre-doped using a constant current pre-doping step.

DETAILED DESCRIPTION

Figure 1:
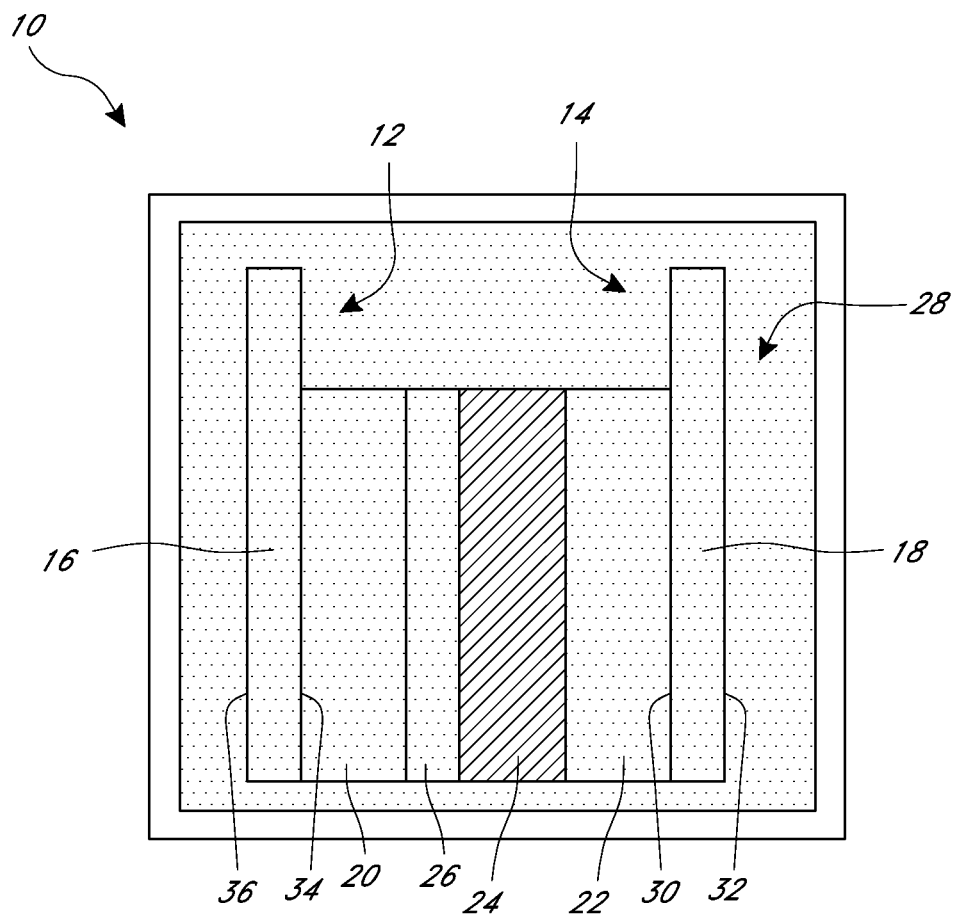
FIG. 1 shows a cross-sectional view of an example lithium ion capacitor according to one embodiment.

Although certain embodiments and examples are described below, those of skill in the art will appreciate that the invention extends beyond the specifically disclosed embodiments and/or uses and obvious modifications and equivalents thereof. Thus, it is intended that the scope of the invention herein disclosed should not be limited by any particular embodiments described below.

Embodiments of the invention relate to lithium ion capacitors and methods of making these capacitors to facilitate improved capacitor performance. In one embodiment, the capacitors are made by pre-doping a capacitor anode using a constant voltage method. The constant voltage pre-doping method can include immersing a dopant source and the capacitor anode in an electrolyte. A constant voltage can be applied across the anode and the dopant source for a duration of time such that a solid-electrolyte interphase layer forms adjacent a surface of the anode. A voltage and/or a duration of a constant voltage pre-doping step can be selected to facilitate achieving a desired level of anode lithium ion pre-doping, for example facilitating a desired capacitor electrical and/or life cycle performance. The constant voltage pre-doping method can include providing a constant or substantially constant voltage of about 0.01 Volts (V) to about 0.4 V between the anode and the dopant source. In one embodiment, the capacitors are made by pre-doping a capacitor anode using a constant current method. The constant current pre-doping method can involve maintaining a constant current between a dopant source and the anode while the dopant source and the anode are immersed an electrolyte. The constant current can be maintained for a duration of time such that a solid-electrolyte interphase layer forms adjacent a surface of the anode. A current and/or a duration of a constant current step can be selected to facilitate achieving a desired voltage difference between the anode and the dopant source. The constant current pre-doping method can include maintaining a constant or substantially constant current between the anode and the dopant source such that a voltage difference of about 0.01 Volts (V) to about 0.4 V can be achieved between the anode and the dopant source. The constant current pre-doing method can include maintaining a constant or substantially constant current corresponding to a current C-rate of about C/24 to about C/144 between the anode and the dopant source. A voltage, a duration of a constant voltage pre-doping step, a current, and/or a duration of a constant current step can be selected to achieve a desired level of anode lithium ion pre-doping, including for example an anode lithium pre-doping level of about 60% to about 90%, such as to facilitate a desired capacitor electrical and/or life cycle performance. A suitable dopant source for the constant voltage and/or constant current pre-doping method provides a source of lithium ions. The constant voltage pre-doping method and/or the constant current pre-doping method can be performed in-situ such that the solid electrolyte interphase layer can be undisturbed subsequent to its formation. The constant voltage pre-doping method and/or the constant current pre-doping method may provide increased control in the formation of the solid-electrolyte interphase layer, facilitating formation of a more uniform and/or more stable solid-electrolyte interphase layer. Improved uniformity and/or stability of the solid-electrolyte interphase layer can improve a capacitance, resistance, and/or reliability performance of the lithium ion capacitor.

As described herein, and as shown in FIG. 1, a lithium ion capacitor (LIC) 10 can have an anode 12 in ionic communication with a cathode 14. The anode 12 and the cathode 14 may be immersed in an electrolyte 28, the electrolyte 28 providing a transport of ionic species between the anode 12 and the cathode 14. The electrolyte 28 may include an electrolyte solvent and an electrolyte salt, the electrolyte salt including an anion and a cation. The electrolyte 28 may be a non-aqueous electrolyte conductive of lithium ions. For example, the electrolyte 28 may include a lithium salt and/or an ammonium salt. In some embodiments, the electrolyte 28 can include an aprotic organic solvent. The electrolyte solvent may provide a desired salt solubility, viscosity, and/or level of chemical and/or thermal stability for a temperature range. For example, the electrolyte solvent may include an ether and/or an ester. In some embodiments, the electrolyte solvent can include a propylene carbonate, a dimethyl carbonate, a vinylene carbonate, a diethylene carbonate, an ethylene carbonate, a sulfolane, an acetonitrile, a dimethoxyethane, a tetrahydrofuran, an ethylmethyl carbonate, combinations thereof, and/or the like. In some embodiments, an electrolyte salt can include hexafluorophosphate ($LiPF_6$), lithium tetrafluoroborate ($LiBF_4$), lithium perchlorate ($LiClO_4$), lithium bis(trifluoromethansulfonyl)imide ($LiN(SO_2CF_3)_2$), lithium trifluoromethansulfonate ($LiSO_3CF_3$), combinations thereof, and/or the like.

The lithium ion capacitor 10 can include a separator 24 between the anode 12 and the cathode 14. The separator 24 may be configured to permit a transport of ionic species between the anode 12 and the cathode 14, while preventing an electrical short between the anode 12 and the cathode 14. In some embodiments, a separator can be made of a porous electrically insulating material. In some embodiments, the separator can be a polymeric material. In some embodiments, the separator can be made of paper.

The anode 12 may include an anode current collector 16 and the cathode 14 may include a cathode current collector 18. The anode current collector 16 and/or the cathode current collector 18 may be configured to facilitate an electrical connection between the anode and/or the cathode and an external circuit, respectively. A current collector (e.g., the anode current collector 16 and/or the cathode current collector 18) can be made of a conductive material, including for example a metallic material. In some embodiments, the current collector can be made of an aluminum foil. In some embodiments, the current collector can be made of silver, copper, gold, platinum, palladium, and/or alloys of the metals. Other suitable conductive materials may also be possible. The current collector may have any suitable shape and/or dimension (e.g., a width, a length, and/or a thickness). For example, the current collector may have a rectangular or substantially rectangular shape (e.g., a rectangular aluminum foil). In some embodiments, the current collector can have a thickness of about 20 microns to about 100 microns. In some embodiments, the current collector can have a thickness of about 30 microns to about 50 microns, for example about 40 microns.

In some embodiments, the cathode 14 can include a first cathode electrode film 22 adjacent a surface 30 of the cathode current collector 18. In some embodiments, the cathode 14 can include a second cathode electrode film adjacent a surface 32 of the cathode current collector 18 opposite that adjacent the first cathode electrode film 22. The cathode 14 can include a cathode active material component. In some embodiments, the cathode electrode film 22 can be made of a cathode active material comprising a porous material. For example, the porous active material may provide a high surface area for the cathode 14. In some embodiments, the porous material may comprise a porous carbon material, including but not limited to particles of activated carbon. The activated carbon can provide a porosity (e.g., a distribution of micropores, mesopores, and/or macropores) configured to facilitate a lithium ion capacitor performance.

In some embodiments, an cathode electrode film 22 can include a binder component and/or an additive component. In some embodiments, the binder component may provide structural support for the active electrode material. For example, the binder component may comprise one or more polymers. The polymers may provide a polymeric matrix support structure for one or more other components of the cathode electrode film 22. In some embodiments, the binder component can comprise a fluoropolymer (e.g., polytetrafluoroethylene, PTFE), a polypropylene, a polyethylene, co-polymers thereof, and/or polymer blends thereof. In some embodiments, the cathode electrode film 22 can comprise at least one of a conductive additive component, for example to improve an electrical conductivity of the cathode electrode film 22. The conductive additive component may comprise conductive carbon particles (e.g., graphite and/or graphene). Other active material components, binder components, and/or additive components may also be suitable.

Composition of a cathode electrode film 22 may be optimized to enable a desired lithium ion capacitor performance. For example, the composition of a cathode electrode film 22 may be configured to provide a desired capacitor capacitance and/or resistance, for example providing a desired device energy density and/or power density performance. In some embodiments, the composition of a cathode electrode film 22 may be configured to provide a desired cycling performance. In some embodiments, a cathode electrode film 22 can comprise from about 50% to about 99% by weight of a cathode active material component (e.g., activated carbon), including from about 60% to about 95% by weight. In some embodiments, a cathode electrode film 22 can comprise from about 1% to about 50% by weight of a binder component. In some embodiments, a cathode electrode film 22 can comprise up to about 30% by weight of an additive component, including for example a conductive additive component for promoting electrical conductivity of the cathode.

In some embodiments, the anode 12 can include a first anode electrode film 20 adjacent a surface 34 of an anode current collector 16. In some embodiments, the anode 12 can include a second anode electrode film adjacent a surface 36 of the anode current collector 16 opposite that adjacent the first anode film 20. An anode electrode film can be made of a material which can reversibly intercalate lithium ions. For example, an electrode film can comprise a carbon material which can reversibly intercalate lithium ions, including but not limited to a graphite material.

In some embodiments, an anode electrode film 20 can include an additive component and/or a binder component. For example, an anode electrode film 20 can include a conductive additive, such as an additive component for promoting electrical conductivity of the anode. In some embodiments, the conductive additive can be a conductive carbon additive, such as a conductive carbon black material. In some embodiments, a binder component of the anode electrode film 20 can include one or more polymers configured to provide a polymeric matrix support structure, including a fluoropolymer (e.g., polytetrafluoroethylene, PTFE), a polypropylene, a polyethylene, co-polymers thereof, and/or polymer blends thereof.

Composition of an anode electrode film 20 may be optimized to enable a desired lithium ion capacitor performance, for example, a desired energy density, power density, and/or cycling performance. In some embodiments, a anode electrode film 20 can comprise from about 50% to about 99% by weight of an active material component (e.g., graphite), including from about 60% to about 95% by weight. In some embodiments, an anode electrode film 20 can comprise from about 1% to about 50% by weight of a binder component. In some embodiments, a cathode electrode film 2 an anode electrode film 20 can comprise up to about 30% by weight of a conductive carbon additive component, including for example a conductive carbon black material.

A solid-electrolyte interphase (SEI) layer 26 can form adjacent a surface of a lithium ion capacitor anode 12, for example during an anode pre-doping step. In some embodiments, the solid-electrolyte interphase layer 26 can form due to an electrochemical reaction involving an electrolyte solvent and/or an electrolyte salt at a surface of the lithium ion capacitor anode 12 adjacent to the electrolyte 28. For example, the solid-electrolyte interphase layer 26 may form due at least in part to a decomposition of one or more components of the electrolyte 28. The solid-electrolyte interphase layer 26 may provide a layer adjacent to the anode 12 which can provide electrical insulation for the anode 12 while being permeable to one or more ionic species.

In some embodiments, a lithium ion capacitor which includes a solid-electrolyte interphase layer 26 providing improved access of lithium ions to the anode 12 can provide a lithium ion capacitor 10 with an improved performance. Improved control in forming a solid-electrolyte interphase layer 26 has been found to facilitate formation of a solid-electrolyte interphase layer having an improved uniformity (e.g., increased homogeneity in a structure and/or composition of the SEI), a decreased thickness, an increased stability (e.g., a thermal and/or chemical stability), and/or a reduced resistance to a transport of lithium ions therethrough. In some embodiments, a solid-electrolyte interphase layer having an improved uniformity, a reduced thickness, an improved stability, and/or an increased permeability of lithium ions may facilitate a lithium ion capacitor having an improved capacitance, a decreased equivalent series resistance, and/or an improved reliability.

In some embodiments, a characteristic or parameter of an anode pre-doping process has been found to affect a characteristic of the solid-electrolyte interphase layer 26. For example, a characteristic of the solid-electrolyte interphase 26 layer may depend at least in part on a level to which the anode 12 is incorporated with lithium ions in the pre-doping process, such as a percentage of available intercalation sites having an intercalated lithium ion (e.g., an anode lithium ion pre-doping level). In some embodiments, an improved control in one or more parameters of an anode pre-doping process was found to facilitate formation of a solid-electrolyte interphase layer having a reduced thickness, an improved uniformity, stability, and/or permeability of lithium ions, such as improved control in the rate at which and/or the level to which an anode 12 is pre-doped with lithium ions.

Figure 2:
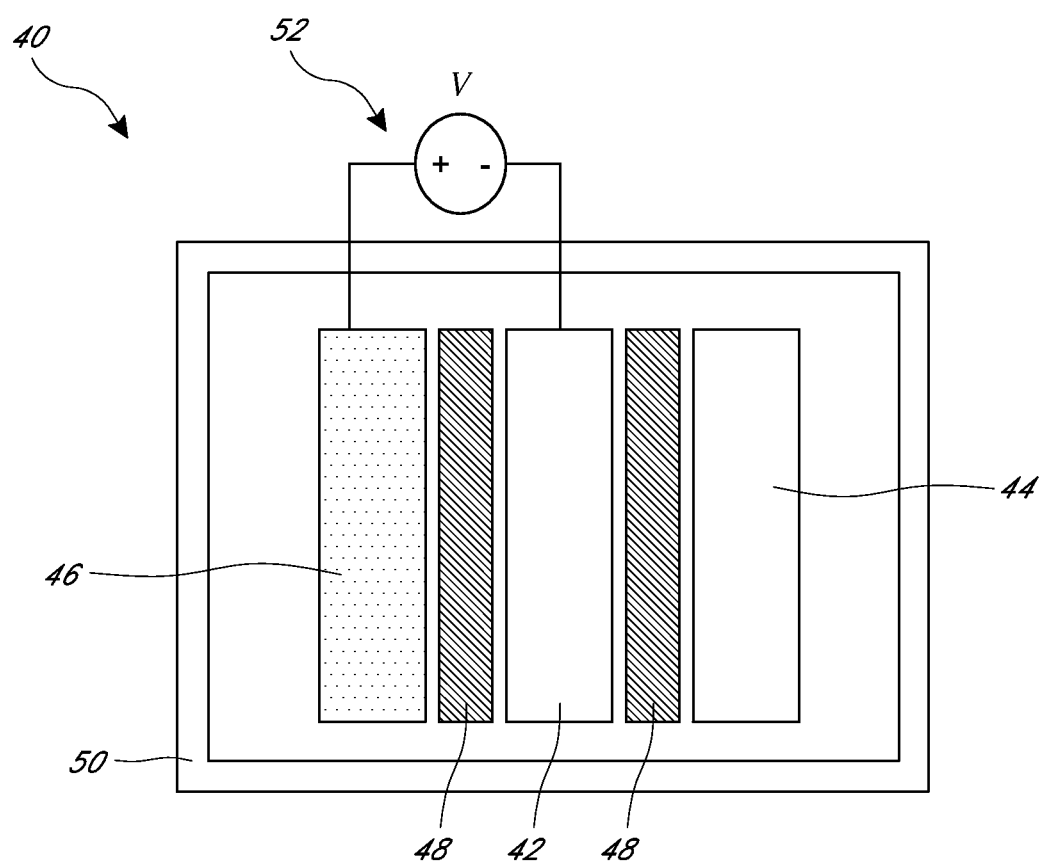
FIG. 2 shows a cross-sectional view of an example lithium ion capacitor anode pre-doping apparatus according to one embodiment.

Referring to FIG. 2, in one embodiment, an anode 42 of a lithium ion capacitor 40 can be pre-doped using a constant voltage charging or constant voltage pre-doping process. Pre-doping a lithium ion capacitor anode 42 using a pre-doping process comprising a constant voltage pre-doping step may facilitate formation of a solid-electrolyte interphase layer having an increased uniformity, stability and/or permeability to lithium ions, thereby providing a lithium ion capacitor having an improved capacitance, a decreased equivalent series resistance and/or an improved cycling performance. For example, pre-doping an anode using a constant voltage pre-doping process may facilitate the formation of a pin-hole free or substantially pin-hole free solid-electrolyte interphase layer, thereby providing a lithium ion capacitor having a reduced degree of capacitance fade after a number of charge-discharge cycles. In some embodiments, a pre-doping process comprising a constant voltage pre-doping step may facilitate a reduced duration of time to achieve a desired level of anode pre-lithiation.

Pre-doping an anode 42 by applying a controlled voltage across the anode 42 and a dopant source 46, for example instead of short circuiting the anode 42 and the dopant source 46, was found to facilitate a formation of a solid-electrolyte interphase layer having an increased uniformity, thereby providing a lithium ion capacitor having decreased equivalent series resistance and/or improved cycling performance. A pre-doping process which includes applying a short circuit across the anode 42 and the dopant source 46, instantaneously or substantially instantaneously creating a potential difference of about 0V between the anode 42 and the dopant source 46, was found to provide a solid-electrolyte interphase layer having reduced uniformity, stability, and/or permeability to lithium ions, and/or providing a pre-doping process requiring a longer duration to achieve a desired level of anode pre-lithiation. For example, a solid-electrolyte interphase layer may form at a potential difference of about 1V. Reducing a potential difference between the anode 42 and the dopant source 46 instantaneously or substantially instantaneously to about 0V may provide a less controlled process of pre-doping of the anode 42, for example providing a less controlled process of solid-electrolyte interphase layer formation during the pre-doping process.

In some embodiments, as shown in FIG. 2, an apparatus for pre-doping a lithium ion capacitor anode 42 can include a dopant source 46 and the anode 42 immersed in an electrolyte 54 (not shown). In some embodiments, the dopant source 46 can comprise a source of lithium ions. For example, the dopant source 46 can comprise a lithium metal. The dopant source 46 may be positioned to a side of the anode 42. For example, the dopant source 46 may be placed to a side of the anode 42 opposite that facing the capacitor cathode 44. In some embodiments, the pre-doping apparatus can include a separator 48 between the dopant source 46 and the anode 42. The separator 48 may be configured to permit a transport of ionic species (e.g., lithium ions) between the anode 42 and the dopant source 46, while preventing an electrical short between the anode 42 and the dopant source 46. In some embodiments, the separator 48 can be made of a porous electrically insulating material (e.g., a material comprising a polymer, including a cellulosic material).

In some embodiments, pre-doping a lithium ion capacitor anode 42 can be performed in-situ. Referring to FIG. 2, in some embodiments, pre-doping a lithium ion capacitor 42 can be performed in a lithium ion capacitor cell 40 comprising the anode 42, the dopant source 46, a capacitor cathode 44, and a separator 48 between the anode 42 and cathode 44, and a separator 48 between the anode 42 and the dopant source 46. The anode 42, the dopant source 46, the cathode 44, and the separators 48 may be immersed in an electrolyte 54 (not shown). The dopant source 46 may be consumed during the constant voltage charging or constant voltage pre-doping step. In some embodiments, the dopant source 46 may be completely or substantially completely consumed during the constant voltage pre-doping step. In some embodiments, at least a portion of the dopant source 46 remains after the constant voltage pre-doping step, any remaining dopant source 46 being removed upon completion of the pre-doping process. In some embodiments, any remaining dopant source 46 can be removed from a lithium ion capacitor 40 and the lithium ion capacitor 40 can subsequently be sealed. For example, a solid-electrolyte interphase layer formed during an anode pre-doping process comprising a constant voltage pre-doping step can be undisturbed or substantially undisturbed subsequent to its formation. In some embodiments, the remaining dopant source 46 may not be removed until after completion of a formation step performed subsequent to the constant voltage pre-doping step, as described in more detail herein.

In some embodiments, a voltage source 52 can be positioned across the anode 42 and the dopant source 46 (e.g., a lithium metal electrode), the voltage source 52 providing a constant or substantially constant voltage across the anode and the dopant source 46, the dopant source 46. For example, the dopant source 46 may be coupled to a first electrode of a voltage source 52, such as a positive electrode of the voltage source 52, and the anode 42 may be coupled to a second electrode of the voltage source 52, such as a negative electrode of the voltage source 52, such that the voltage source 52 can maintain a desired potential difference between the dopant source 46 and the anode 42. In some embodiments, a constant or substantially constant voltage can be applied across the anode 42 and the dopant source 46 for a duration of time to achieve a desired level of anode pre-lithiation. During a pre-doping process, dopants at the dopant source 46 may be released. For example, lithium metal at a dopant source 46 comprising a lithium metal electrode may be oxidized. Oxidation of the lithium metal may facilitate a release of lithium ions, thereby providing lithium ions for incorporation into the anode 42.

A characteristic or a parameter of an anode pre-doping process may affect a characteristic of a solid-electrolyte interphase layer formed adjacent an anode surface during the anode pre-doping process. In some embodiments, a formation of a solid-electrolyte interphase layer adjacent the anode 42 can depend at least in part on a voltage applied across the anode 42 and the dopant source 46, a duration in which the voltage is applied across the anode 42 and the dopant source 46, and/or a desired level of dopant incorporation into the anode 42. For example, a voltage value which is applied across the anode 42 and the dopant source 46 during an anode pre-doping process, a level of dopant incorporation into the anode 42 during the pre-doping process, and/or a duration for which the voltage value is applied across the anode 42 and the dopant source 46 may affect a thickness, a uniformity, a stability and/or a permeability of a solid-electrolyte interphase layer which can form adjacent an anode surface during the anode pre-doping process.

A voltage applied across the anode 42 and the dopant source 46 during a pre-doping process, a duration for which the voltage is applied across the anode 42 and the dopant source 46, and/or a level of anode pre-lithiation may be determined based at least in part on a desired lithium ion capacitor performance. For example, an applied voltage, a duration in which the voltage is applied, and/or a level of anode pre-lithiation may be selected based at least in part on a desired lithium ion capacitor equivalent series resistance performance, a capacitor capacitance performance, and/or a capacitor cycling performance. In some embodiments, a cycling performance of the lithium ion capacitor may comprise a degree of capacitance fade exhibited by the capacitor after a number of charge-discharge cycles. For example, a voltage applied across the anode 42 and the dopant source 46 and a duration in which the voltage is applied may be selected based at least in part on a desired level of anode pre-lithiation, the level of pre-lithiation corresponding to a formation of a solid-electrolyte interphase layer adjacent a surface of the anode having desirable characteristics, thereby providing a lithium ion capacitor having an improved performance (e.g., a reduced equivalent series resistance, and/or improved cycling performance).

In some embodiments, a constant voltage pre-doping process includes applying a voltage of about 0.001 volts (V) to about 0.400 volts (V), including from about 0.01V to about 0.2V, across an anode 42 and a dopant source 46. For example, a voltage of about 0.01V to about 0.4V may be applied across the anode 42 and the dopant source 46. For example, a voltage of about 0.1V may be applied across the anode 42 and the dopant source 46.

In some embodiments, a formation step can be performed subsequent to a constant voltage pre-doping step. A formation step may facilitate improvement and/or stabilization in a characteristic of a solid-electrolyte interphase layer formed during the pre-doping step. For example, the formation step can facilitate stabilization of a structural, thermal and/or chemical characteristic of the solid-electrolyte interphase layer, further improving a solid-electrolyte interphase layer uniformity, integrity and/or permeability to lithium ions. In some embodiments, the formation step can include application of a constant voltage across the anode 42 and the dopant source 46 for a period of time. In some embodiments, a formation step voltage of about 2 Volts (V) to about 5 V can be applied between the anode 42 and the dopant source 46 in the formation step. For example, a formation step voltage can be from about 2 V to about 4.5 V, including about 3V to about 4V, including from about 3.5V to about 4V. In some embodiments, the formation step voltage can be about 2 V to about 4.2 V. The formation step voltage can be applied for a duration of about 5 hours to about 75 hours, including from about 10 hours to about 50 hours. For example, a formation step voltage of about of about 3.5V to about 4V can be applied across the anode 42 and the dopant source 46 for about 10 hours to about 50 hours.

The dopant source 46 may be consumed during the formation step. In some embodiments, the dopant source 46 may be completely or substantially completely consumed during the formation step. Any remaining dopant source 46 can be removed upon completion of the formation step. In some embodiments, any remaining dopant source 46 can be removed from the lithium ion capacitor 40 and the lithium ion capacitor 40 can be subsequently sealed. The solid-electrolyte interphase layer present during the anode pre-doping process and/or during the formation step may advantageously be the same solid-electrolyte interphase layer through which lithium ions are transported in a subsequent charge and/or discharge of the lithium ion capacitor, the solid-electrolyte interphase layer being undisturbed or substantially undisturbed subsequent to its formation.

Figure 3:
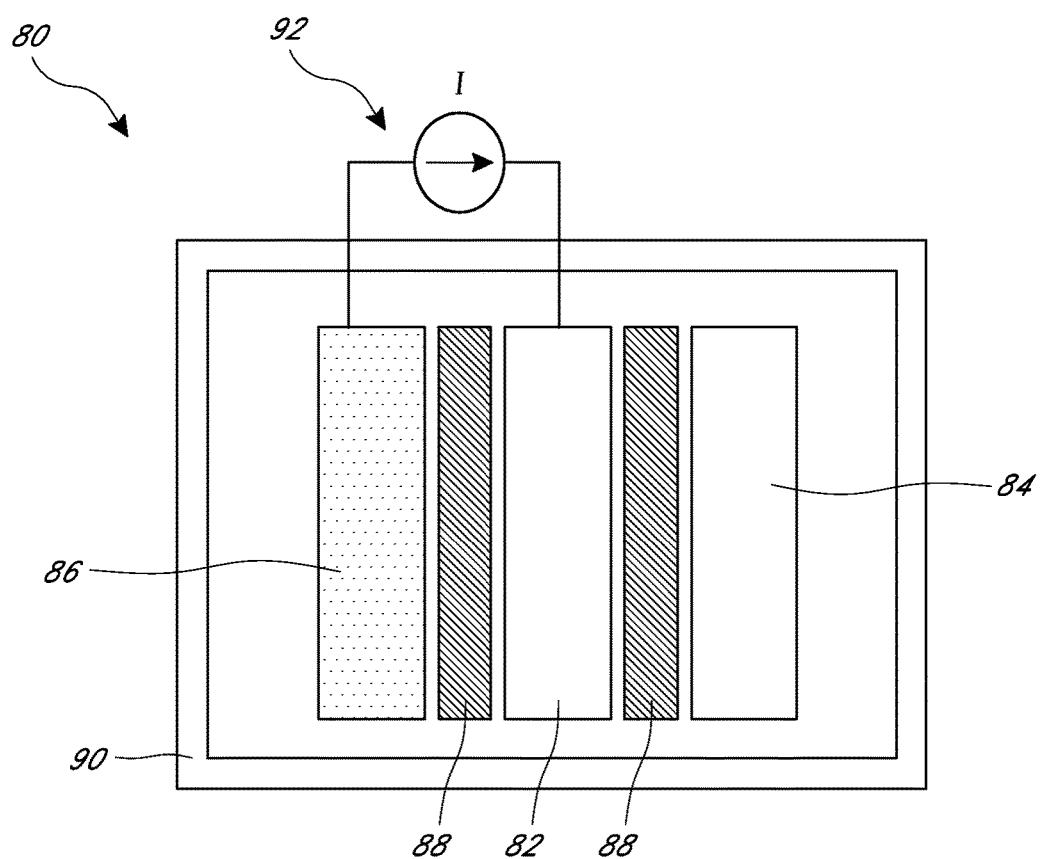
FIG. 3 shows a cross-sectional view of an example lithium ion capacitor anode pre-doping apparatus according to one embodiment.

Referring to FIG. 3, in one embodiment, an anode 82 of a lithium ion capacitor 80 can be pre-doped using a process comprising a constant current pre-doping step. Pre-doping a lithium ion capacitor anode using a constant current pre-doping step was found to facilitate formation of a solid-electrolyte interphase layer having an increased uniformity, stability and/or permeability of lithium ions. For example, pre-doping an anode using a constant current pre-doping step facilitated the formation of a solid-electrolyte interphase layer having improved structural, thermal and/or chemical stability, and/or a solid-electrolyte interphase free or substantially free of pin-hole defects, thereby providing a lithium ion capacitor having a reduced degree of capacitance fade after a number of charge-discharge cycles. In some embodiments, a pre-doping process comprising a constant current pre-doping step may reduce a duration of time needed to achieve a desired level of anode pre-lithiation.

Pre-doping an anode 82 by applying a controlled current across the anode 82 and a dopant source 86, for example instead of short circuiting the anode 82 and the dopant source 86, facilitated formation of a solid-electrolyte interphase layer having an increased uniformity, thereby providing a lithium ion capacitor having decreased equivalent series resistance and/or improved cycling performance.

Referring to FIG. 3, in one embodiment, pre-doping a lithium ion capacitor anode 82 using a process comprising a constant current pre-doping step can be performed in a lithium ion capacitor cell 80 (e.g., performed in-situ), the lithium ion capacitor 80 comprising the anode 82, a cathode 84, and a separator 88 between the anode 82 and cathode 84. In some embodiments, as shown in FIG. 3, the lithium ion capacitor 80 can include a dopant source 86. The dopant source 86 may comprise a source of lithium ions. For example, the dopant source 86 can comprise a lithium metal (e.g., a lithium metal electrode). The dopant source 86 may be positioned to a side of the anode 82. For example, the dopant source 86 may be positioned to a side of the anode 82 opposite the side facing the cathode 84. In some embodiments, the lithium ion capacitor 80 can include a separator 88 between the dopant source 86 and the anode 82. The separators 88 may be configured to prevent an electrical short between the anode 82 and the dopant source 86 or the cathode 84, while being permeable to one or more ionic species (e.g., lithium ions). The separator 88 can be made of a porous electrically insulating material (e.g., a material comprising a polymer, including a cellulosic material). The anode 82, the cathode 84, the dopant source 86, and the separators 88 may be immersed in an electrolyte 94 (not shown).

The dopant source 86 may be consumed during the constant current charging or pre-doping step. In some embodiments, the dopant source 86 may be completely or substantially completely consumed during the constant current pre-doping step. In some embodiments, at least a portion of the dopant source 86 remains after the constant current pre-doping step and the remaining portion of the dopant source 86 can be removed upon completion of the pre-doping process. In some embodiments, any remaining dopant source 86 can be removed from a lithium ion capacitor 80 and the lithium ion capacitor 80 can be subsequently sealed. For example, a solid-electrolyte interphase layer formed during an anode pre-doping process comprising a constant current pre-doping step can be undisturbed or substantially undisturbed subsequent to its formation. In some embodiments, the dopant source 86 may not be removed until after completion of a formation step performed subsequent to the constant current pre-doping step, as described in more detail herein.

In some embodiments, a current source 92 providing a constant or substantially constant current flow can be positioned across an anode 82 and a dopant source 86 (e.g., a lithium metal electrode). For example, the dopant source 86 may be coupled to a first electrode of a current source 92 and the anode 82 may be coupled to a second electrode of the current source 92 such that the current source 92 can maintain a desired current flow between the dopant source 86 and the anode 82. In some embodiments, a current corresponding to a current C-rate of about C/24 to about C/144 (e.g., a current C-rate of about C/24 can correspond to a current such that the capacitor can be completely or substantially completely discharged in about 24 hours, and a current C-rate of about C/144 can correspond to a current such that the capacitor can be completely or substantially completely discharged in about 144 hours), including from about C/48 to about C/120, including from about C/72 to about C/96, may be maintained between the anode 82 and the dopant source 86. In some embodiments, the current source 92 can provide a current corresponding to a current C-rate of about C/72 to about C/144. For example, a current corresponding to a current C-rate of about C/72 may be maintained between the anode 82 and the dopant source 86.

In some embodiments, a constant or substantially constant current flow can be maintained between the anode 82 and the dopant source 86 for a duration of time. For example, a current flow may be maintained until a desired potential difference between the anode 82 and the dopant source 86 is achieved. In some embodiments, a potential difference between an anode 86 and a dopant source 86 may be reduced from a value at about an open circuit voltage value to a desired voltage value. For example, a current flow of a constant or substantially constant value may be maintained between the anode 82 and the dopant source 86 such that a potential difference between the anode 82 and the dopant source 86 may be reduced from about an open circuit voltage (OCV) (e.g., about 3V) to a desired potential difference. In some embodiments, an anode pre-doping process comprising maintaining a constant current flow between an anode 82 and a dopant source 86 can provide a method of controlled anode pre-lithiation. For example, a constant or substantially constant current can be maintained until a potential difference of about 0.01V to 0.4V, including about 0.01V to about 0.2V is achieved across the anode 82 and the dopant source 86. In some embodiments, a constant or substantially constant current can be maintained until a potential difference of about 0.1V is achieved across the anode 82 and the dopant source 86.

In some embodiments, an anode pre-doping process comprising a constant current charging step can provide increased control of an anode pre-lithiation level, and/or an improved control over formation of a solid-electrolyte interphase layer adjacent the anode. In some embodiments, a characteristic of a solid-electrolyte interphase layer formed adjacent the anode 82 during a pre-doping process can depend at least in part on a characteristic or parameter of the pre-doping process, including but not limited to a current flow maintained between the anode 82 and the dopant source 86, a duration in which the current flow is maintained, and/or a desired level of dopant incorporation into the anode 82. For example, a current value which is maintained between the anode 82 and the dopant source 86 during an anode pre-doping process, a level of dopant incorporation into the anode 82 during the pre-doping process, and/or a duration for which the current value which is maintained between the anode 82 and the dopant source 86 may affect a thickness, a uniformity, a stability and/or a permeability of a solid-electrolyte interphase layer which can form adjacent an anode surface during the anode pre-doping process.

A current maintained between the anode 82 and the dopant source 86 during a pre-doping process, a duration for which the current is maintained between the anode 82 and the dopant source 86, and/or a level of anode pre-lithiation may be determined based at least in part on a desired lithium ion capacitor performance. For example, a current flow, a duration in which the current is maintained, and/or a level of anode pre-lithiation may be selected based at least in part on a desired lithium ion capacitor equivalent series resistance performance, a capacitance performance, and/or a cycling performance (e.g., a degree of capacitance fade exhibited by the capacitor after a number of charge-discharge cycles). For example, current maintained between the anode 82 and the dopant source 86, and a duration in which the current is maintained may be selected based at least in part on a desired level of anode pre-lithiation, the level of pre-lithiation corresponding to a formation of a solid-electrolyte interphase layer adjacent a surface of the anode having desirable characteristics, thereby providing a lithium ion capacitor having an improved performance (e.g., a reduced equivalent series resistance, and/or improved cycling performance).

In some embodiments, a formation step can be performed subsequent to a constant current pre-doping step. A formation step may facilitate improvement and/or stabilization in a characteristic of a solid-electrolyte interphase layer formed during the constant current pre-doping step. For example, the formation step performed subsequent to the constant current pre-doping step can facilitate stabilization of a structural, thermal and/or chemical characteristic of the solid-electrolyte interphase layer, further improving a solid-electrolyte interphase layer uniformity, integrity and/or permeability to lithium ions. In some embodiments, this formation step can include application of a constant voltage across the anode 82 and the dopant source 86 for a period of time. In some embodiments, a formation step voltage of about 2 Volts (V) to about 5 V can be applied between the anode 82 and the dopant source 86 in the formation step. For example, a formation step voltage can be from about 2 V to about 4.5 V, including about 3V to about 4V, including from about 3.5V to about 4V. In some embodiments, the formation step voltage can be about 2 V to about 4.2 V. The formation step voltage can be applied for a duration of about 5 hours to about 75 hours, including from about 10 hours to about 50 hours. For example, a formation step voltage of about of about 3.5V to about 4V can be applied across the anode 82 and the dopant source 86 for about 10 hours to about 50 hours.

The dopant source 86 may be consumed during the formation step, including being completely or substantially completely consumed. In some embodiments, at least a portion of the dopant source 86 remains upon completion of the formation step, and the remaining dopant source 86 can be removed from the lithium ion capacitor 80 and the lithium ion capacitor 80 can be subsequently sealed. The solid-electrolyte interphase layer present during the constant current anode pre-doping process and/or during the formation step may advantageously be the same solid-electrolyte interphase layer through which lithium ions are transported in a subsequent capacitor charge and/or discharge, the solid-electrolyte interphase layer being undisturbed or substantially undisturbed subsequent to its formation.

In some embodiments, a voltage of a constant-voltage pre-doping step, a current of a constant current pre-doping step, and/or a duration of a pre-doping step can be selected to achieve a desired level of lithium ion pre-doping in a capacitor anode. For example, a level of lithium ion pre-doping can be selected to facilitate improved capacitor capacitance, resistance and/or cycling performance. In some embodiments, the voltage of a constant-voltage pre-doping process, the current of a constant-current pre-doping process, and/or the duration of the pre-doping process, can be selected to facilitate achieving a lithium ion pre-doping level of about 50% to about 90%, including about 60% to about 65%.

FIGS. 4 through 8 show capacitance, resistance and/or cycling performances of one or more lithium ion capacitors pre-doped using one or more of the constant voltage pre-doping or constant current pre-doping processes described herein. Components of the one or more capacitors can have one or more compositions as described herein.

Figure 4:
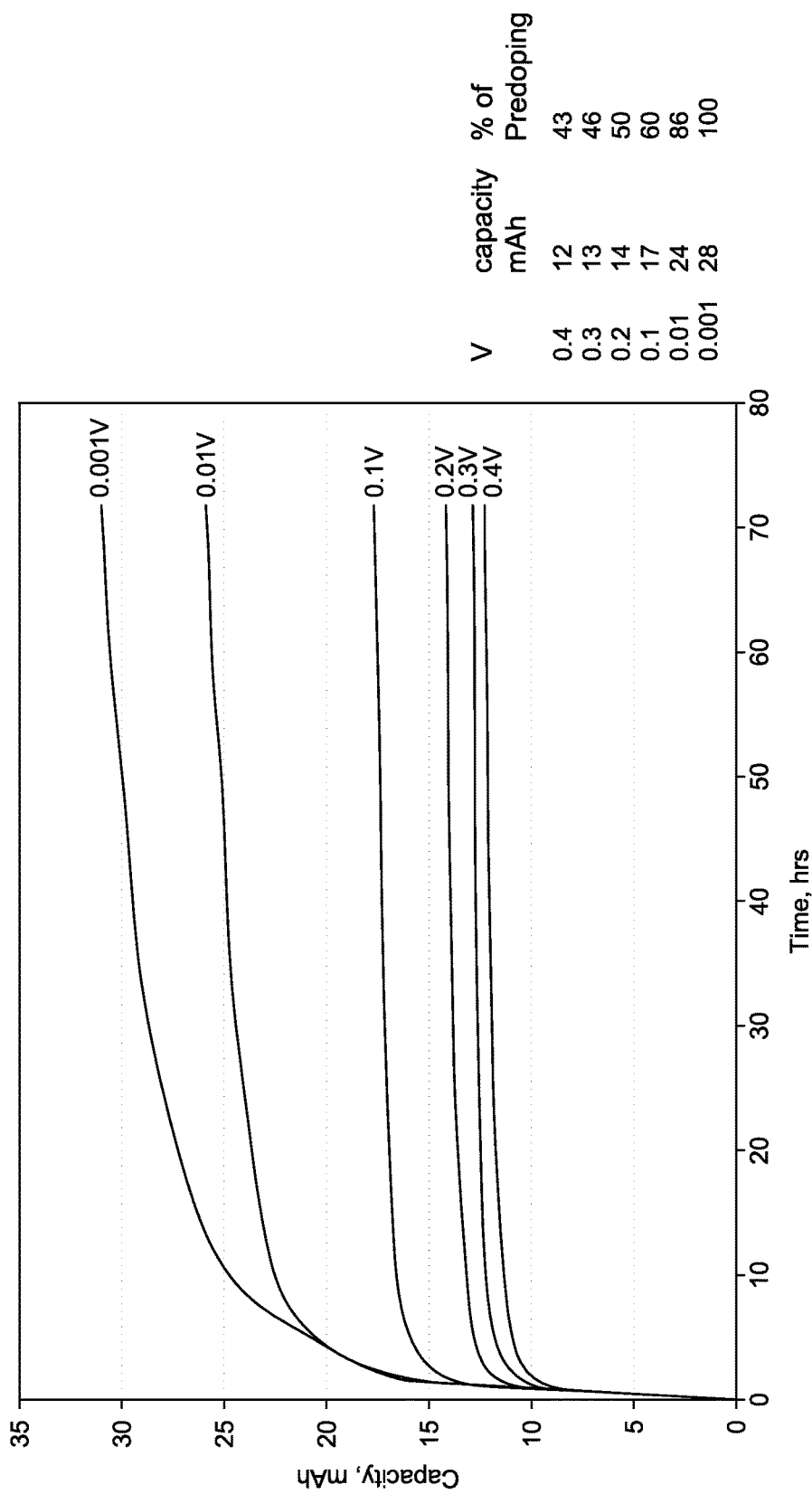
FIG. 4 is a line graph of measured capacity values corresponding to voltages applied in a constant voltage pre-doping step.

FIG. 4 shows measured capacity performances of example anodes of lithium ion capacitors pre-doped using a pre-doping process comprising a constant voltage pre-doping process. Lithium ion capacitors were subject to a pre-doping process comprising a constant voltage pre-doping step (e.g., a pre-doping process including an example capacitor 40 as shown in FIG. 2), and the capacity of the lithium ion capacitors was subsequently measured. FIG. 4 shows an increase in a measured capacity, in milliampere-hour (mAh), when a decreased voltage is applied during a constant voltage pre-doping process. As shown in FIG. 4, a lithium ion capacitor having an anode pre-doped using a constant voltage pre-doping step at a constant voltage of about 0.1V can have an anode capacity measurement (e.g., at about 18 mAh, larger than that of a lithium ion capacitor having an anode pre-doped using a constant voltage of about 0.2V (e.g., at about 14 mAh).

FIG. 4 also shows a level of anode lithium ion pre-doping and corresponding voltage maintained during the constant voltage pre-doping step. As shown in FIG. 4, a level of lithium ion pre-doping (e.g., a level of lithium ion incorporation, a level of pre-lithiation) into an anode can be proportional to a constant voltage value applied during a pre-doping process, the level of lithium ion incorporation decreasing with an increasing constant voltage value. For example, a level of lithium ion pre-doping in an anode pre-doped using a constant voltage of about 0.4 Volts (V) can have a lower lithium ion pre-doping level than that of an anode pre-doped using a constant voltage of about 0.1V. A voltage applied in a constant voltage pre-doping step may be selected based on a desired level of anode lithium ion pre-pre-doping.

FIG. 5 includes a table showing example measured lithium ion capacitor performance parameters of capacitors corresponding to some of the capacitor anodes shown in FIG. 4. FIG. 5 shows measured lithium ion capacitor performance parameters corresponding to voltage values (e.g., "Pre-lithiation Voltage") applied during a constant voltage pre-doping process. For each applied constant voltage listed in FIG. 5, a corresponding percentage of anode pre-lithiation (e.g., "% predoping"), a capacitance value measured in Farads (F) (e.g., "Capacitance, F"), an equivalent series resistance measured in Ohms (Ω) (e.g., "ESR, Ohms"), and an RC time constant calculated from the measured capacitance value and the measured resistance of the lithium ion capacitor, are listed. For values shown in FIG. 5, the lithium ion capacitor having an anode which was pre-doped using a constant voltage of about 0.1 V in a constant voltage pre-doping step exhibited the lowest RC time constant, and/or measured equivalent series resistance. As shown in FIG. 5, the anode of the capacitor having the lowest RC time constant was pre-doped to a lithium ion pre-doping level of about 60%.

Figure 6:
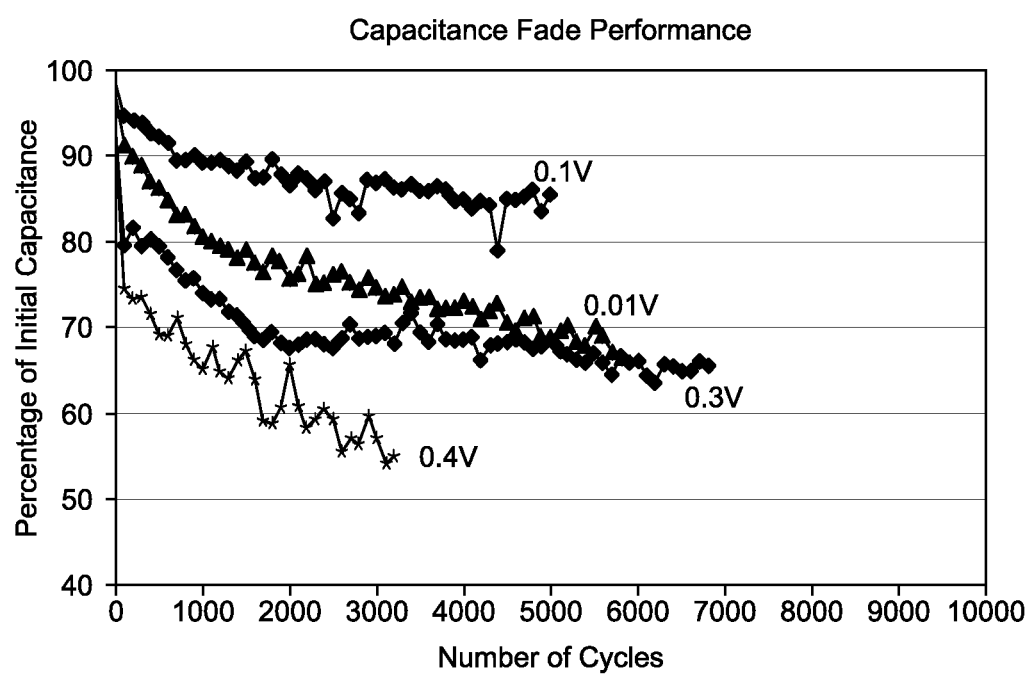
FIG. 6 is a line graph of cycling performances of lithium ion capacitors having an anode which was pre-doped using a constant voltage pre-doping step.

FIG. 6 shows cycling performance of some of the lithium ion capacitors of FIG. 4. For example, a capacitance of the lithium ion capacitors was measured after cycling a number of cycles between a voltage of about 2.2 Volts (V) and 4.2 V, at a current C-rate of about 30 C (e.g., a current C-rate of about 30 C can correspond to a current such that the capacitor can be completely or substantially completely discharged in about 1/30 of an hour), in ambient conditions, to measure a percentage of reduction in measured capacitance as compared to an initial capacitance of the lithium ion capacitor prior to cycling (e.g., a capacitance fade performance). FIG. 6 shows a general improvement in the cycling performance as voltage applied during a constant voltage pre-doping step decreases. For example, in FIG. 6, the lithium ion capacitor having an anode which was pre-doped using a constant voltage of about 0.1V in a constant voltage pre-doping step show a reduced degree of capacitance fade after a number of charge-discharge cycles, for example as compared to that of a capacitor having an anode pre-doped using a constant voltage of about 0.4V. A lithium ion capacitor exhibiting a reduced degree of capacitance fade, a reduced equivalent series resistance and/or a reduced RC time constant, may have a solid-electrolyte interphase layer having a decreased thickness, an increased uniformity, an improved stability and/or an increased permeability of lithium ions.

FIG. 7 includes a table showing example measured lithium ion capacitor performance parameters corresponding to current flow rates (e.g., "C-rate") maintained during a constant current pre-doping step of an anode pre-doping process. In FIG. 7, current maintained during a constant current pre-doping step is expressed as a rate at which the capacitor can be discharged and/or charged, a larger C-rate corresponding to a higher current. For example, a current corresponding to a C-rate of about C/48 is greater than a current corresponding to a C-rate of about C/96. For each maintained constant current listed in FIG. 8, a corresponding level to which lithium ions were incorporated into an anode of the lithium ion capacitor (e.g., "% pre-doping"), a capacitance value measured in Farads (F) (e.g., "Capacitance, F"), an equivalent series resistance measured in Ohms (Ω) (e.g., "ESR, Ohms"), and an RC time constant calculated from the capacitance value and the resistance of the lithium ion capacitor, are listed. For values shown in FIG. 7, decreasing a constant current flow rate maintained between an anode and a dopant source can reduce an equivalent series resistance, and/or RC time constant, of the lithium ion capacitor. For example, as shown in FIG. 7, capacitors having anodes pre-doped at reduced currents can demonstrate a reduced equivalent series resistance (ESR) and/or RC time constant. In some embodiments, a decreased current maintained during a constant current pre-doping step can facilitate increased lithium ion pre-doping level. As shown in FIG. 7, an anode pre-doped to a level of about 60% to about 65% can demonstrate a reduced equivalent series resistance (ESR) and/or RC time constant.

Figure 8:
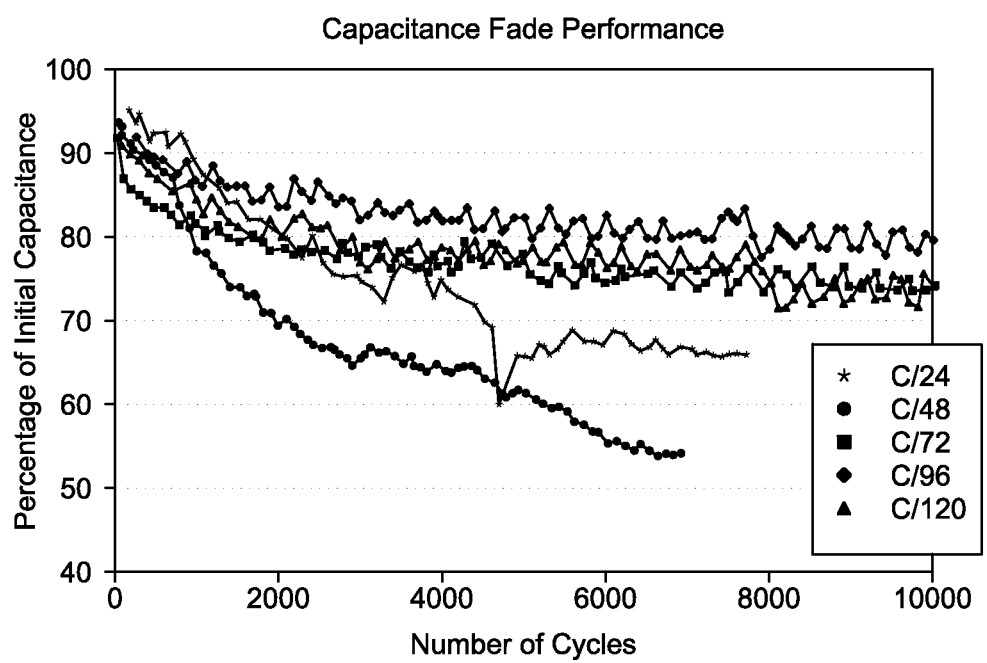
FIG. 8 is a graph of cycling performances of lithium ion capacitors having an anode which was pre-doped using a constant current pre-doping step.

FIG. 8 shows cycling performance of some of the lithium ion capacitors of FIG. 7. For example, a capacitance of the lithium ion capacitors was measured after cycling a number of cycles between a voltage of about 2.2 Volts (V) and 4.2 V, at a current C-rate of about 30 C (e.g., a current C-rate of about 30 C can correspond to a current such that the capacitor can be completely or substantially completely discharged in about 1/30 of an hour), in ambient conditions to measure a percentage of reduction in measured capacitance as compared to an initial capacitance of the lithium ion capacitor prior to cycling (e.g., a capacitance fade performance). FIG. 8 shows a general improvement in the cycling performance as current maintained during a constant current step decreases. For example the lithium ion capacitor having an anode which was pre-doped using a constant current charging step having a current C-rate of about C/96, as shown in FIG. 8, shows a reduced degree of capacitance fade after a number of charge-discharge cycles. In some embodiments, a lithium ion capacitor exhibiting a reduced degree of capacitance fade a reduced equivalent series resistance, and/or a reduced RC time constant, may have a solid-electrolyte interphase layer having a decreased thickness, an increased uniformity, an improved stability and/or an increased permeability of lithium ions.

An anode pre-doping process comprising a constant voltage pre-doping step and/or a constant current pre-doping step may provide an increased control over a degree of anode pre-lithiation. A voltage maintained in a constant voltage pre-doping step, or a current maintained in a constant current pre-doping step, can be selected based on a desired anode lithium ion pre-doping level. An improved control in a level to which lithium ions are incorporated into a lithium ion capacitor anode may provide an improved control in a formation of a solid-electrolyte interphase layer, facilitating for example an improved lithium ion capacitor performance. In some embodiments, an anode pre-doping process comprising a constant voltage pre-doping step and/or a constant current pre-doping step can facilitate formation of a solid-electrolyte interphase layer having an improved stability, uniformity, and/or permeability of lithium ions. An anode pre-doping process comprising a constant voltage pre-doping step and/or a constant current pre-doping step may provide a lithium ion capacitor exhibiting a reduced equivalent series resistance performance, a reduced RC time constant, and/or a reduced degree of capacitance fade after a number charge-discharge cycles.

Although this invention has been disclosed in the context of certain embodiments and examples, it will be understood by those skilled in the art that the invention extends beyond the specifically disclosed embodiments to other alternative embodiments and/or uses of the invention and obvious modifications and equivalents thereof. In addition, while several variations of the embodiments of the invention have been shown and described in detail, other modifications, which are within the scope of this invention, will be readily apparent to those of skill in the art based upon this disclosure. It is also contemplated that various combinations or sub-combinations of the specific features and aspects of the embodiments may be made and still fall within the scope of the invention. It should be understood that various features and aspects of the disclosed embodiments can be combined with, or substituted for, one another in order to form varying modes of the embodiments of the disclosed invention. Thus, it is intended that the scope of the invention herein disclosed should not be limited by the particular embodiments described above.

The headings provided herein, if any, are for convenience only and do not necessarily affect the scope or meaning of the devices and methods disclosed herein.

What is claimed is:

1. A method of pre-doping an anode of an energy storage device, the method comprising:

immersing the anode and a dopant source in an electrolyte, wherein the dopant source comprises a source for lithium ions; and coupling a substantially constant current between the anode and the dopant source;

wherein the coupling comprises coupling the substantially constant current between the anode and the dopant source for a duration of time to achieve a potential difference between the anode and the dopant source of 0.01 Volts (V) to 0.4 V.

2. The method of claim 1, wherein the energy storage device comprises a lithium ion capacitor.

3. The method of claim 1, wherein the coupling comprises coupling the substantially constant current between the anode and the dopant source for a duration of time to achieve an anode pre-doping level of 60% to 90%.

4. The method of claim 1, wherein coupling the substantially constant current between the anode and the dopant source comprises coupling a current source supplying a substantially constant current corresponding to a current C-rate of C/72 to C/144.

5. The method of claim 1, further comprising forming a substantially homogeneous solid-electrolyte interphase layer adjacent the anode, wherein the solid-electrolyte interphase layer is substantially undisturbed subsequent to its formation.

6. The method of claim 1, further comprising removing the dopant source from the electrolyte subsequent to coupling the substantially constant current across the anode and the dopant source.

7. The method of claim 1, further comprising immersing a cathode in the electrolyte, wherein immersing the dopant source comprises immersing the dopant source to a side of the anode opposite that facing the cathode.

8. The method of claim 1, further comprising performing a formation step subsequent to coupling the substantially constant current across the anode and the dopant source.

9. The method of claim 8, wherein performing the formation step comprises applying a substantially constant voltage of 2 Volts (V) to 4.2V between the anode and the dopant source.

10. The method of claim 9, wherein performing the formation step comprises applying the substantially constant voltage of 2 Volts (V) to 4.2V between the anode and the dopant source for a duration of 5 hours to 75 hours.

11. A method of pre-doping an anode of an energy storage device, the method comprising:

immersing the anode and a dopant source in an electrolyte, wherein the dopant source comprises a source for lithium ions; and coupling a substantially constant voltage across the anode and the dopant source;

wherein coupling the substantially constant voltage across the anode and the dopant source comprises coupling a voltage source supplying a substantially constant voltage of 0.01 Volts (V) to 0.4V.

12. The method of claim 11, wherein the energy storage device comprises a lithium ion.

13. The method of claim 11, wherein coupling the substantially constant voltage across the anode and the dopant source comprises coupling the substantially constant voltage for a duration of time to achieve an anode lithium ion pre-doping level of 60% to 90%.

14. The method of claim 11, further comprising performing a formation step subsequent to coupling the substantially constant voltage across the anode and the dopant source.

15. The method of claim 14, wherein performing the formation step comprises applying a substantially constant voltage of 2 Volts (V) to 4.2V between the anode and the dopant source.

16. The method of claim 15, wherein performing the formation step comprises applying the substantially constant voltage of 2 Volts (V) to 4.2V between the anode and the dopant source for a duration of 5 hours to 75 hours.

17. The method of claim 11, further comprising forming a substantially homogeneous solid-electrolyte interphase layer adjacent the anode, wherein the solid-electrolyte interphase layer is substantially undisturbed subsequent to its formation.

18. The method of claim 11, further comprising removing the dopant source subsequent to coupling the substantially constant voltage across the anode and the dopant source.

19. The method of claim 11, further comprising immersing a cathode in the electrolyte, wherein immersing the dopant source comprises immersing the dopant source to a side of the anode opposite that facing the cathode.

20. A method of pre-doping an anode of an energy storage device, the method comprising:

immersing the anode and a dopant source in an electrolyte, wherein the dopant source comprises a source for lithium ions; and coupling a substantially constant current between the anode and the dopant source;

wherein coupling the substantially constant current between the anode and the dopant source comprises coupling a current source supplying a substantially constant current corresponding to a current C-rate of C/72 to C/144.

21. The method of claim 20, wherein the energy storage device comprises a lithium ion capacitor.

22. The method of claim 20, wherein the coupling comprises coupling the substantially constant current between the anode and the dopant source for a duration of time to achieve an anode pre-doping level of 60% to 90%.

23. The method of claim 20, further comprising forming a substantially homogeneous solid-electrolyte interphase layer adjacent the anode, wherein the solid-electrolyte interphase layer is substantially undisturbed subsequent to its formation.

24. The method of claim 20, further comprising removing the dopant source from the electrolyte subsequent to coupling the substantially constant current across the anode and the dopant source.

25. The method of claim 20, further comprising immersing a cathode in the electrolyte, wherein immersing the dopant source comprises immersing the dopant source to a side of the anode opposite that facing the cathode.

26. The method of claim 20, further comprising performing a formation step subsequent to coupling the substantially constant current across the anode and the dopant source.

27. The method of claim 26, wherein performing the formation step comprises applying a substantially constant voltage of 2 Volts (V) to 4.2V between the anode and the dopant source.

28. The method of claim 27, wherein performing the formation step comprises applying the substantially constant voltage of 2 Volts (V) to 4.2V between the anode and the dopant source for a duration of 5 hours to 75 hours.

* * * * *